(12) United States Patent
Xiao et al.

(10) Patent No.: US 10,069,723 B2
(45) Date of Patent: Sep. 4, 2018

(54) METHOD AND SYSTEM FOR ENCAPSULATING FLOW IDENTIFIER

(71) Applicant: ZTE Corporation, Shenzhen (CN)

(72) Inventors: Min Xiao, Shenzhen (CN); Junhui Zhang, Shenzhen (CN); Bo Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 71 days.

(21) Appl. No.: 15/035,799

(22) PCT Filed: Jun. 13, 2014

(86) PCT No.: PCT/CN2014/079888
§ 371 (c)(1),
(2) Date: May 11, 2016

(87) PCT Pub. No.: WO2015/070601
PCT Pub. Date: May 21, 2015

(65) Prior Publication Data
US 2016/0261492 A1     Sep. 8, 2016

(30) Foreign Application Priority Data

Nov. 14, 2013   (CN) .......................... 2013 1 0566964

(51) Int. Cl.
*H04L 12/721* (2013.01)
*H04L 12/46* (2006.01)
(Continued)

(52) U.S. Cl.
CPC .......... *H04L 45/38* (2013.01); *H04L 12/4633* (2013.01); *H04L 41/0686* (2013.01);
(Continued)

(58) Field of Classification Search
CPC . H04L 45/38; H04L 41/0686; H04L 47/2483; H04L 41/0816; H04L 54/64; H04L 12/4633; H04L 2212/00
See application file for complete search history.

(56) References Cited

U.S. PATENT DOCUMENTS

| | | | |
|---|---|---|---|
| 2013/0054761 A1* | 2/2013 | Kempf | H04L 12/4633 709/220 |
| 2013/0176850 A1* | 7/2013 | Mishra | H04L 49/00 370/235 |
| 2014/0226661 A1* | 8/2014 | Mekkattuparamban | H04L 45/74 370/392 |

FOREIGN PATENT DOCUMENTS

| | | |
|---|---|---|
| CN | 103314557 A | 9/2013 |
| CN | 103369613 A | 10/2013 |

(Continued)

OTHER PUBLICATIONS

International Search Report for corresponding application PCT/CN2014/079888 filed on Jun. 13, 2014; dated Aug. 29, 2014.
(Continued)

*Primary Examiner* — Mohammad S Anwar
(74) *Attorney, Agent, or Firm* — Cantor Colburn LLP

(57) ABSTRACT

Disclosed is a method and system for encapsulating a flow identifier. The method for encapsulating a flow identifier comprises: in the case where flow table matching is successfully performed on a packet, an OpenFlow switch adds a flow identifier to the packet; and the OpenFlow switch invokes a pre-saved function entry to assign a value to the flow identifier, so as to complete the encapsulation of the flow identifier. The disclosure achieves the effect of enabling an OpenFlow network node to take a hash calculation result of some fields of an original packet before encapsulation as (Continued)

```
┌─────────────────────────────────────────────┐
│ the action of adding a flow identifier and  │
│ the action of invoking the function entry   │
│ to assign a value to the flow identifier    │──S1002
│ are performed on a packet entering the      │
│ OpenFlow switch when flow table matching    │
│ is performed successfully                   │
└─────────────────────────────────────────────┘
                     │
                     ▼
┌─────────────────────────────────────────────┐
│ under the trigger of the above-mentioned    │
│ action, a function calculation is performed │
│ on some fields of the packet entering the   │──S1004
│ OpenFlow switch according to the above-     │
│ mentioned function entry, and a function    │
│ calculation result is returned to the action│
│ of assignment (set-field)                   │
└─────────────────────────────────────────────┘
``` the assignment of a new added flow identifier, which is required by the encapsulation of the flow identifier.

18 Claims, 7 Drawing Sheets

(51) Int. Cl.
  *H04L 12/715* (2013.01)
  *H04L 12/24* (2006.01)
  *H04L 12/851* (2013.01)
(52) U.S. Cl.
  CPC .......... *H04L 41/0816* (2013.01); *H04L 45/64* (2013.01); *H04L 47/2483* (2013.01); *H04L 2212/00* (2013.01)

(56) References Cited

FOREIGN PATENT DOCUMENTS

| | | | |
|---|---|---|---|
| WO | 2012109837 | A1 | 8/2012 |
| WO | 2012109909 | A1 | 8/2012 |
| WO | 20120171382 | A1 | 12/2012 |
| WO | 2013113171 | A1 | 8/2013 |

OTHER PUBLICATIONS

"Open Flow Switch Specification, Version 1.4,0", Oct. 14, 2013, pp. 1-206, Retrieved from Internet, URL: https://www.opennetworking.org/images/storied/downloads/adn-resources/onf-specification/openflow/openflow-spec-v1.4.0.pdf; XP055235997.
European Search Report for corresponding application EP 14862657; Report dated Oct. 17, 2016.

\* cited by examiner

| Destination MAC address (6 bytes) |
|---|
| Source MAC address (6 bytes) |
| MPLS tunnel label (n*4 bytes) |
| Pseudowire label (4 bytes) |
| Flow label (4 bytes) |
| Optional control word (4 bytes) |
| Payload (original Ethernet frame) |

Fig. 1

| Destination MAC address (6 bytes) |
|---|
| Source MAC address (6 bytes) |
| MPLS tunnel label (n*4 bytes) |
| Entropy label (4 bytes) |
| Payload (original IP packet or original Ethernet frame encapsulated by a pseudowire) |

Fig. 2

| Destination MAC address (6 bytes) |
|---|
| Source MAC address (6 bytes) |
| VLAN tag (4 bytes) |
| Flow filtering tag (6 bytes) |
| Service Instance tag (6 bytes) |
| Payload (original Ethernet frame) |

Fig. 3

Each flow table can realize adding an outer label and assigning a value to the newly encapsulated outer label by performing the actions of "Push-Tag" and "Set-Field"

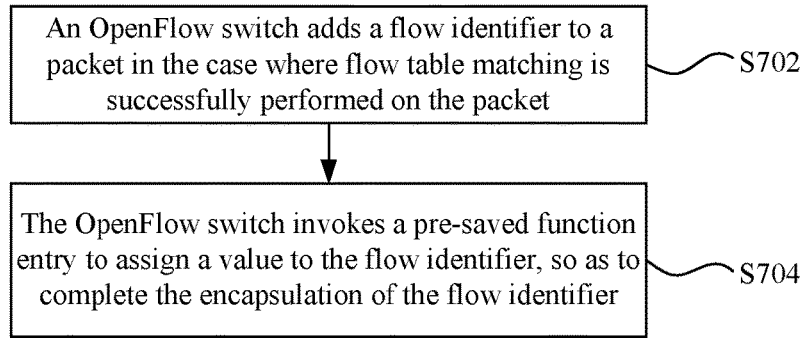
Fig. 6
Fig. 7
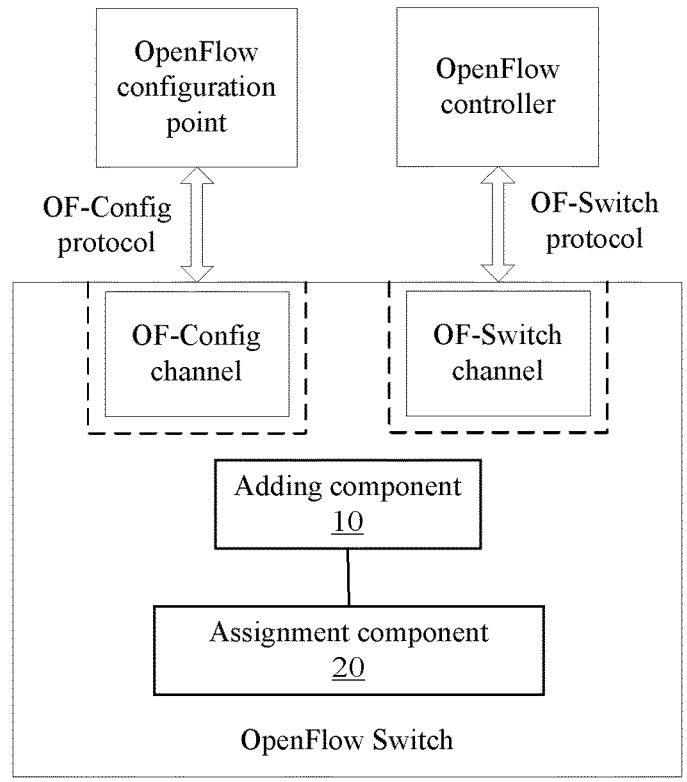
Fig. 8

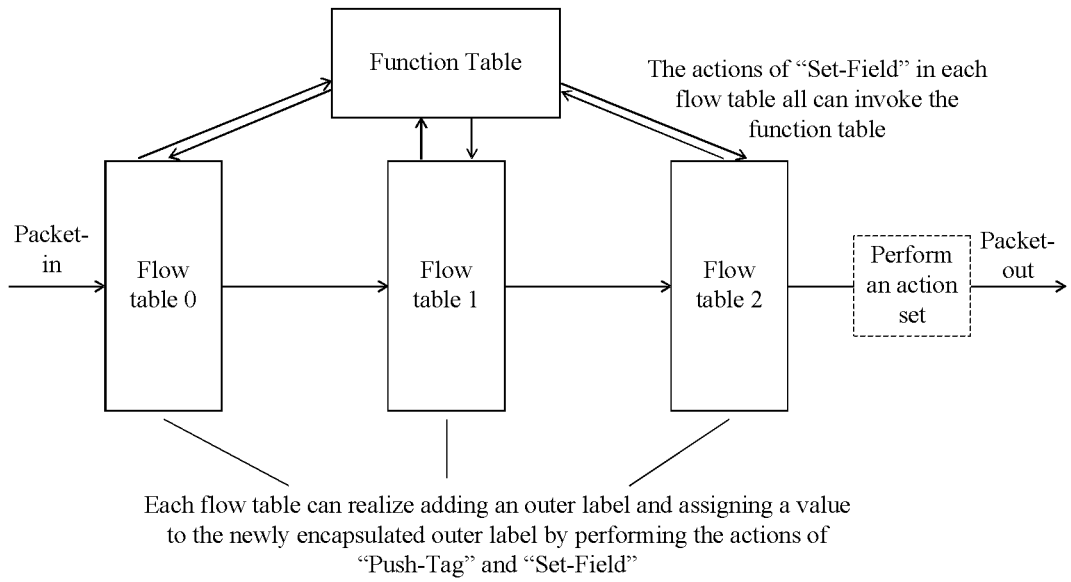
Fig. 11
| Function ID | Function Parameters | Function |
Fig. 12
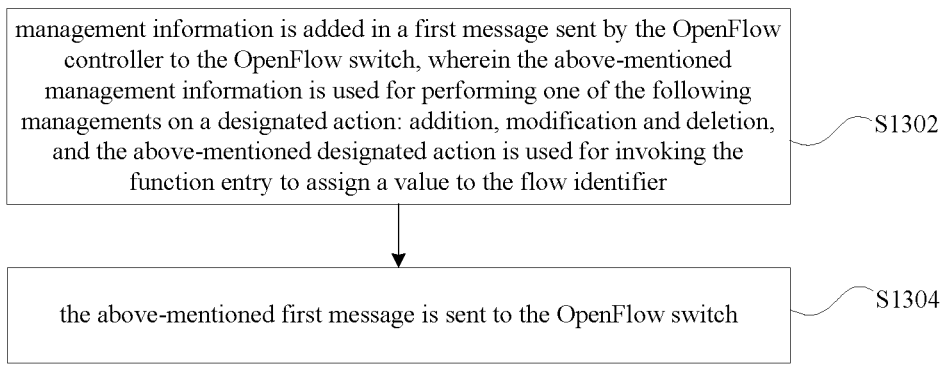
Fig. 13

| Match Fields | Priority | Counters | Instructions | Timeouts | Cookie |
|---|---|---|---|---|---|
| In_Port = 10, VLAN_ID = 100 | | | Apply-Actions {Push MPLS Label; Set MPLS Label ID101} | | |

Fig. 14

| Function ID | Function Parameters | Function |
|---|---|---|
| 101 | MAC address and IP quintuple | Hash calculation using hash algorithm 1 |

Fig. 15

| Match Fields | Priority | Counters | Instructions | Timeouts | Cookie |
|---|---|---|---|---|---|
| In_Port = 20 | | | Apply-Actions {Push MPLS Label; Set MPLS Label ID102} | | |
| In_Port = 30 | | | Apply-Actions {Push Flow Filtering Tag; Set Flow Filtering Tag ID103} | | |

Fig. 16

| Function ID | Function Parameters | Function |
|---|---|---|
| 102 | IP quintuple | Hash calculation using hash algorithm 2 |
| 103 | MAC address and IP quintuple | Hash calculation using hash algorithm 3 |

Fig. 17

METHOD AND SYSTEM FOR ENCAPSULATING FLOW IDENTIFIER

TECHNICAL FIELD

The disclosure relates to the field of communications, in particular to a method and system for encapsulating a flow identifier.

BACKGROUND

In data communications network, in order to improve the utilization of network nodes and network links and reduce the impact of the failure of a single node or a single link on the service traffic, the application of Equal Cost Multiple Paths (ECMP) technology is wider and wider, the ECMP technology may distribute the service traffics with the same source and the same destination into different flows, so that different flows can be forwarded along different transmission paths of equal cost.

In order to realize ECMP, generally, forwarding table entries comprising a plurality of outbound interfaces are firstly calculated using routing protocols such as intermediate system to intermediate system (IS-IS) or open shortest path first (OSPF) on a network node. After having received a packet which is to be forwarded and matches the forwarding table entry, the network node performs hash calculation on some preset fields (such as IP quintuple comprising a source IP address, a source port, a destination IP address, a destination port and a transport layer protocol number) of the packet, then a modular (mod) operation is performed on the number of outbound interfaces through a hash value, so as to obtain an outbound interface index, so that one of the plurality of outbound interfaces included in the forwarding table entry can be selected according to the index, and then the packet is forwarded from the selected outbound interface. Since values of the above-mentioned pre-set fields included in the packet matching the above-mentioned forwarding table entry may be different, and the network node may calculate different hash values according to different values of the fields; therefore, service traffics matching the same forwarding table entry are distributed to different flows on a single network node, and different outbound interfaces are selected for different flows. All the nodes in the network perform the above-mentioned operations of distributing service traffics to different flows and selecting different outbound interfaces for different flows, so that the technological purpose of ECMP can be achieved.

An overlay network represented by a Multi-Protocol Label Switching (MPLS) network and a Provider Backbone Bridging (PBB) network is a very common data communication network of the current application. The so-called overlay network is configured to divide a network into an overlay network edge layer and an overlay network core layer, the overlay network edge layer is responsible for performing encapsulation on an original packet entering the overlay network, the destination address of the encapsulated packet points to an remote edge node of the overlay network, the overlay network edge layer is also responsible for performing decapsulation on the encapsulated packet which is forwarded out of the overlay network, and the overlay network core layer is responsible for forwarding the encapsulated packet according to the destination address of the encapsulated packet. The edge nodes of the overlay network complete the function of overlay network edge layer, and the edge nodes and the intermediate nodes of the overlay network together complete the function of the overlay network core layer. If it is desired to realize ECMP in the overlay network, there is a method that a core layer (comprising edge nodes and intermediate nodes) of the overlay network performs a hash calculation on some preset fields (such as IP quintuple) comprising an original packet in the encapsulated packet, and selects an outbound interface according to hash calculation; however, the method requires that the network node extracts some preset fields comprising an original packet in the encapsulated packet, since the fields of the original packet are located at a relatively deep position in the encapsulated packet, extracting these fields is a relatively heavy burden for the network node, and the realization of the existing hardware devices are relatively complex and expensive. In order to solve the defects of the above-mentioned method, the Internet Engineering Task Force (IETF) and the Institute of Electrical and Electronics Engineers (IEEE) respectively propose similar solutions for the MPLS network and the PBB network, the fundamental principle is that firstly a flow identifier is encapsulated to the original packet entering the overlay network on the edge layer of the overlay network, and then a standardized MPLS encapsulation or PBB encapsulation is performed, the value of the flow identifier comes from a result (i.e. hash value) of hash calculation on some preset fields (such as IP quintuple) of the original packet, when the core layer of the overlay network performs hash calculation on the encapsulated packet to select an outbound interface, there is no need to extract some fields of the original packet located at a relatively deep position in the encapsulated packet, and only a flow identifier which represents the flow information of the original packet and is located at a relatively shallow position in the encapsulated packet needs to be extracted, so that the burden of the network node is greatly alleviated, and the complexity and high costs of the hardware implementation are shielded. In the IETF standard RFC 6391, in order to realize ECMP based on a Pseudo Wire (PW) in the MPLS network, a Flow Label (FL) used as the flow identifier is specified, the position of the flow label in the encapsulated packet is as shown in FIG. 1; in the IETF standard RFC 6790, in order to realize ECMP based on a Label Switched Path (LSP) in the MPLS network, an Entropy Label (EL) used as the flow identifier is specified, the position of the entropy label in the encapsulated packet is as shown in FIG. 2; and in the IEEE standard 802.1Qbp, in order to realize ECMP in the PBB network, a Flow Filtering Tag (F-TAG) used as the flow identifier is specified, the position of the flow filtering tag in the encapsulated packet is as shown in FIG. 3.

With the proposing of the concept of Software Defined Network (SDN) and the development of the application thereof, the OpenFlow technology, as the SDN core technology, is in a stage of rapid development, and at present, the OpenFlow network built using the OpenFlow technology has been increasingly used in the actual production life. The OpenFlow network uses an architecture where a control plane and a forwarding plane (also called as data plane) are separated. FIG. 4 is an architecture schematic diagram of an OpenFlow network component according to the related art; as shown in FIG. 4, the management plane of the OpenFlow network is realized by OpenFlow configuration point, which is a device running network management software, and the specific device form thereof may be a personal computer or a server and the like. The control plane of the OpenFlow network is realized by an OpenFlow controller, which is a device having a powerful computing capability, and the specific device form thereof may be a personal computer, a server or a server cluster the like, and a network application (APP) may invoke the OpenFlow controller by an application programming interface (API), so as to realize the control of the OpenFlow network. The forwarding plane of the OpenFlow network is realized by an OpenFlow switch, which is a device having a powerful switching capability, and the specific device form thereof is a network device configured with a plurality of network ports and performing packet processing and forwarding based on a flow table. An OpenFlow management and configuration (OF-Config) protocol is operated at an interface between the OpenFlow configuration point and the OpenFlow switch, and an OpenFlow switch (OF-Switch) protocol is operated at an interface between the OpenFlow controller and the OpenFlow switch. The Open Networking Foundation (ONF) is responsible for making and modifying the above-mentioned two protocols.

The ONF formally issues the 1.1.1 version of the OF-Config protocol on March 2013 and specifies the flow of the OF-Config protocol. The ONF formally issues the 1.4.0 version of the OpenFlow switch specification on October 2013, which specifies the flow of the OF-Switch protocol and the packet processing flow inside the OpenFlow switch, wherein the method on how to realize adding the outer label and assigning a value to the outer label on the OpenFlow switch is included. FIG. 5 is a schematic flow chart of packet processing for the OpenFlow switch to realize adding an outer label and assigning a value to the outer label according to the related art. As shown in FIG. 5, flow table matching is firstly performed on a packet entering the OpenFlow switch from an ingress port, wherein the flow table is sent down by the OpenFlow controller to OpenFlow switch through the OF-Switch protocol in advance. FIG. 6 is a format diagram of an OpenFlow flow table according to the related art, as shown in FIG. 6, the flow table may comprise a plurality of flow table entries, the match fields in each flow table entry may be any field (such as an MAC address field, an IP address field and an MPLS label field) in the packet header. After the flow table matching is completed, instructions in the corresponding flow table entry will be performed on the packet matching flow table successfully, wherein the instructions may comprise one or more actions, that is, a plurality of actions may be performed sequentially on packets matching flow table successfully. Two continuous actions of "pushing a label (Push-Tag)" and "assigning the label (Set-Field)" may be respectively for adding an outer label and assigning a value to the outer label, wherein the action of Push-Tag for adding an outer label not only can support adding an outer MPLS label, but also can support adding an outer PBB label or adding an outer VLAN label, since the flow label specified in the IETF standard RFC 6391 and the entropy label specified in the RFC 6790 have the same form definition with the MPLS label, and the flow filtering tag specified in the IEEE standard 802.1Qbp have similar form definitions with the VLAN tag, it can be considered that the action of Push-Tag in the related art may support adding various flow identifiers, and the action of Set-Field may support the assignment of various added outer label (such as an MPLS label, a PBB label or a VLAN tag); however, only an explicit numerical value (such as 100) may be assigned, since the flow identifier is also a kind of outer label, it can be considered that the action of Set-Field in the related art can support the explicit assignment of the flow identifier.

In summary, according to the current OpenFlow switch specification, the OpenFlow switch (i.e., an OpenFlow network node) can only assign an explicit numerical value to a new added outer label, and it cannot be achieved that a hash calculation result (i.e., hash value) of some fields comprising an original packet before encapsulation is used as the assignment of a new added flow identifier, which is required by the encapsulation of the flow identifier.

For the problem in the related art that the OpenFlow switch cannot realize the encapsulation of the flow identifier, no effective solution has been provided at present.

SUMMARY

A method and system for encapsulating a flow identifier is provided in the embodiments of the disclosure to at least solve the above-mentioned problem that the OpenFlow switch cannot realize the encapsulation of the flow identifier.

According to one aspect of the embodiments of the disclosure, the method for encapsulating the flow identifier is provided, comprising: in the case where flow table matching is successfully performed on a packet, an OpenFlow switch adds a flow identifier to the packet, and the OpenFlow switch invokes a pre-saved function entry to assign a value to the flow identifier, so as to complete the encapsulation of the flow identifier.

Preferably, before the OpenFlow switch performs flow table matching on the packet, the method comprises: the OpenFlow switch receives a flow table configuration message from an OpenFlow controller, wherein the flow table configuration message comprises flow table information and/or management information, wherein the flow table information comprises a flow table entry comprising an instruction for adding the flow identifier and an instruction for invoking the function entry to assign a value to the flow identifier; and the management information is used for performing one of the following managements on the operation of invoking the function entry to assign the value to the flow identifier: addition, modification and deletion.

Preferably, the management information includes an indicating bit, the indicating bit being used for indicating that the management information includes a function identification value for invoking the function entry and does not include an explicit numerical value to be assigned to the flow identifier.

Preferably, the source of the function entry comprises one of the following: the manufacturer embeds the function entry in the OpenFlow switch in the manufacturing process, an OpenFlow configuration point configures the function entry to the OpenFlow switch through an extended OF-Config protocol, and the OpenFlow controller carries the function entry in a function entry management message and sends same to the OpenFlow switch.

Preferably, the function entry management message comprises a configuration message and/or a read message for a function table including the function entry, wherein the configuration message for the function table is used for performing one of the following managements on the function table and the function entry in the function table: addition, modification and deletion; and the read message for the function table is used for reading the function table and the function entry in the function table.

Preferably, the method further comprises: after receiving the configuration message and/or the read message for the function table, the OpenFlow switch performs a local configuration and/or read operation on the function entry; and in the case where the local configuration and/or read operation fails, the OpenFlow switch sends an error message for indicating that the corresponding local configuration and/or read operation fails to the OpenFlow controller.

Preferably, in the case where the source of the function entry is that the OpenFlow controller carries the function entry in the function entry management message and sends same to the OpenFlow switch, the method comprises: before the OpenFlow controller sends the function entry, the OpenFlow switch receives a message for querying a capability of supporting the function entry sent by the OpenFlow controller, wherein the message for querying the capability of supporting the function entry is used for querying whether the OpenFlow switch has a capability of supporting the function entry and which function entry can be supported.

Preferably, the content of the function entry comprises: a function ID field, a function parameter field and a function field, wherein the function ID field is a function identification value for invoking the function entry when the value is assigned to the flow identifier; the function parameter field is used for selecting fields from the packet to serve as a function parameter; and the function field is used for indicating a predetermined function calculation method and algorithm.

Preferably, the flow identifier comprises one of the following: a Pseudo Wire (PW) flow label, a Label Switched Path (LSP) entropy label and a Provider Backbone Bridging (PBB) flow filtering tag.

According to another aspect of the embodiments of the disclosure, the system for encapsulating the flow identifier is provided, comprising: an OpenFlow controller, an OpenFlow configuration point and an OpenFlow switch, wherein the OpenFlow switch comprises an adding component configured to add a flow identifier to the packet in the case where flow table matching is successfully performed on a packet; and an assignment component configured to invoke a function entry to assign a value to the flow identifier, so as to complete the encapsulation of the flow identifier.

Preferably, the OpenFlow switch further comprises a first receiving component configured to receive a flow table configuration message from the OpenFlow controller, wherein the flow table configuration message comprises flow table information and/or management information, wherein the flow table information comprises a flow table entry comprising an instruction for adding the flow identifier and an instruction for invoking the function entry to assign the flow identifier; and the management information is used for performing one of the following managements on the operation of invoking the function entry to assign the value to the flow identifier: addition, modification and deletion.

Preferably, the management information includes an indicating bit, wherein the indicating bit is used for indicating that the management information includes a function identification value for invoking the function entry and does not include an explicit numerical value to be assigned to the flow identifier.

Preferably, the source of the function entry comprises one of the following: the manufacturer embeds the function entry inside the OpenFlow switch in the manufacturing process, an OpenFlow configuration point configures the function entry to the OpenFlow switch through an extended OF-Config protocol, and the OpenFlow controller carries the function entry in a function entry management message and sends same to the OpenFlow switch.

Preferably, the function entry management message comprises a configuration message and/or a read message for a function table including the function entry, wherein the configuration message for the function table is used for performing one of the following managements on the function table and the function entry in the function table: addition, modification and deletion; and the read message for the function table is used for reading the function table and the function entry in the function table.

Preferably, the OpenFlow switch further comprises a second receiving component, configured to receive the configuration message and/or the read message for the function table including the function entry, which is sent by the OpenFlow controller; a configuration component configured to perform the local configuration and/or read operation on the function entry according to the configuration message and/or the read message for the function table including the function entry; and a sending component configured to send an error message for indicating that a corresponding configuration and/or read operation fails to the OpenFlow controller in the case where the local configuration and/or read operation fails.

Preferably, in the case where the source of the function entry is the OpenFlow controller carrying the function entry in a function entry management message and sending same to the OpenFlow switch, the switch further comprises a third receiving component configured to receive, before the OpenFlow controller sends the function entry, a message for querying the capability of supporting the function entry sent by the OpenFlow controller, wherein the message for querying the capability of supporting the function entry is used for querying whether the OpenFlow switch has a capability of supporting the function entry or not and which function entry can be supported.

Preferably, the content of the function entry comprises: a function ID field, a function parameter field and a function field, wherein the function ID field is a function identification value for invoking the function entry when the flow identifier is assigned; the function parameter field is used for selecting fields from the packet to serve as a function parameter; and the function field is used for indicating a predetermined function calculation method and algorithm.

Preferably, the flow identifier comprises one of the following: a pseudo wire (PW) flow label, a label switched path (LSP) entropy label and a provider backbone bridging (PBB) flow filtering tag.

By means of the embodiments of the disclosure, an OpenFlow switch adds a flow identifier to the packet, and the OpenFlow switch invokes a pre-saved function entry to assign the value to the flow identifier, so as to complete the encapsulation of the flow identifier, thereby solving the problem in related art that the OpenFlow switch cannot realize the encapsulation of the flow identifier and achieving the effect of enabling an OpenFlow network node to take a hash calculation result of some fields of an original packet before encapsulation as the assignment of a new added flow identifier, which is required by the encapsulation of the flow identifier.

BRIEF DESCRIPTION OF THE DRAWINGS

Drawings, provided herein for further understanding of the present disclosure and forming a part of the specification, are used to explain the present disclosure together with embodiments of the present disclosure rather than to limit the present disclosure. In the drawings:

FIG. 1 shows a schematic diagram of a position of a flow label in an encapsulated packet according to the related art;

FIG. 2 shows a schematic diagram of a position of an entropy label in an encapsulated packet according to the related art;

FIG. 3 shows a schematic diagram of a position of a flow filtering tag in an encapsulated packet according to the related art;

FIG. 6 shows a format diagram of an OpenFlow flow table according to the related art;

FIG. 7 shows a flowchart of a method for encapsulating a flow identifier according to an embodiment of the disclosure;

FIG. 8 shows a structural block diagram of a system for encapsulating a flow identifier according to an embodiment of the disclosure;

FIG. 11 shows a schematic flow chart illustrating an OpenFlow switch processes a packet to realize adding an outer label and assigning a value to the outer label according to a preferred embodiment of the disclosure;

FIG. 12 shows a format diagram of an OpenFlow function table according to a preferred embodiment of the disclosure;

FIG. 13 shows another flowchart illustrating the encapsulation of the flow identifier in an OpenFlow network according to a preferred embodiment of the disclosure;

FIG. 14 shows a schematic diagram of the content of a flow table in the OpenFlow switch according to preferred embodiment I of the disclosure;

FIG. 15 shows a schematic diagram of the content of a function table in the OpenFlow switch according to preferred embodiment I of the disclosure;

FIG. 16 shows a schematic diagram of the content of a flow table in the OpenFlow switch according to preferred embodiment II of the disclosure; and FIG. 17 shows a schematic diagram of the content of a function table in the OpenFlow switch according to preferred embodiment II of the disclosure.

DETAILED DESCRIPTION OF THE EMBODIMENTS

Figure 4:
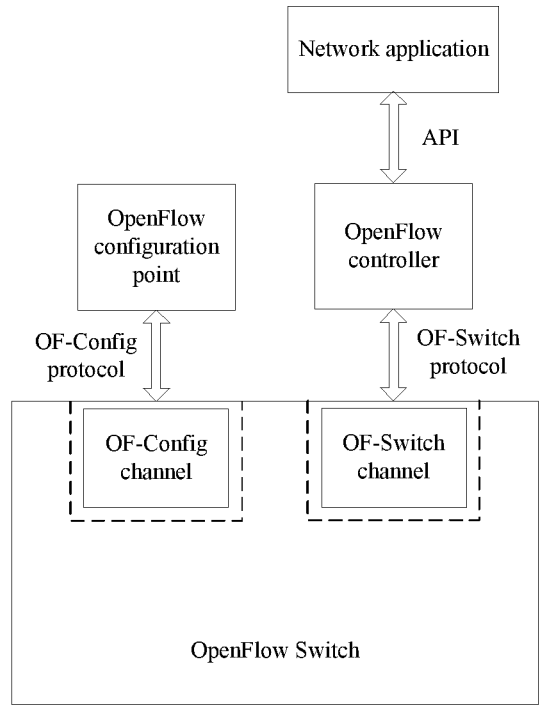
FIG. 4 shows an architecture schematic diagram of an OpenFlow network component according to the related art.
Figure 5:
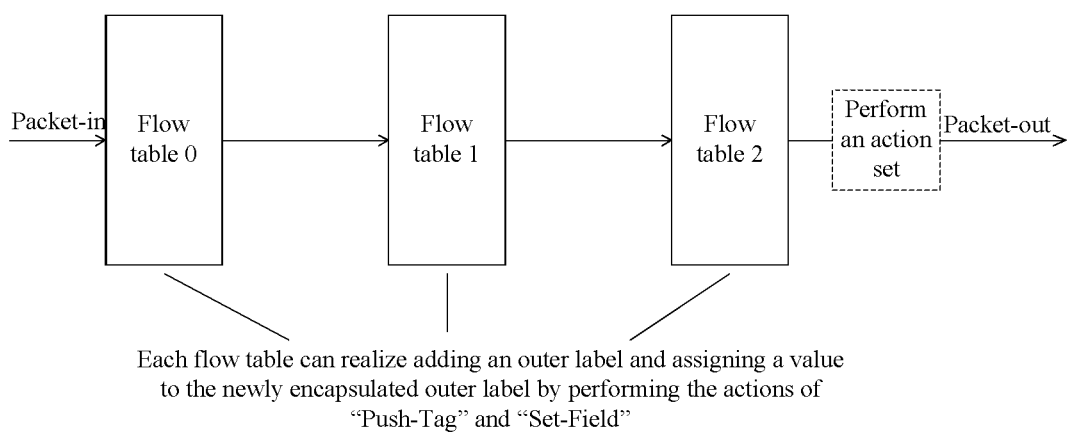
FIG. 5 shows a schematic flow chart of packet processing for the OpenFlow switch to realize adding an outer label and assigning a value to the outer label according to the related art.

The present disclosure is described below in detail by reference to the accompanying drawings in conjunction with embodiments. It should be noted that the embodiments and the characteristics of the embodiments may be combined with each other if no conflict is caused.

A system for encapsulating a flow identifier is provided by an embodiment of the disclosure, which mainly relate to a method which can realize the encapsulation of a flow identifier in an OpenFlow network. By means of the embodiment of the disclosure, the OpenFlow network node may take a hash calculation result (i.e., a hash value) of some fields of an original packet before encapsulation as the assignment of a new added flow identifier, which is required by the encapsulation of the flow identifier, thereby overcoming the defect in the related art that the encapsulation of the flow identifier cannot be realized.

A method for encapsulating a flow identifier is provided by an embodiment of the disclosure. FIG. 7 is a flowchart of a method for encapsulating a flow identifier according to an embodiment of the disclosure. As shown in FIG. 7, the method mainly includes the following steps (step S702-step S704).

In step S702, an OpenFlow switch adds a flow identifier to a packet in the case where flow table matching is successfully performed on the packet.

In step S704, the OpenFlow switch invokes a pre-saved function entry to assign a value to the flow identifier, so as to complete an encapsulation of the flow identifier.

By means of the above-mentioned embodiment, the OpenFlow switch may add the flow identifier to the packet, and invokes the pre-saved function entry to assign the value to the flow identifier, so as to complete the encapsulation of the flow identifier. The OpenFlow network node may therefore take a hash calculation result of some fields of an original packet before encapsulation as the assignment of a new added flow identifier, which is required by the encapsulation of the flow identifier.

In the present embodiment, before the OpenFlow switch performs flow table matching on the packet, the OpenFlow switch may receive a flow table configuration message from an OpenFlow controller, wherein the flow table configuration message may comprise flow table information and/or management information, wherein the flow table information may comprise a flow table entry which may comprise an instruction for adding the flow identifier and an instruction for invoking the function entry to assign the value to the flow identifier; and the management information is used for performing one of the following managements on the operation of invoking the function entry to assign the value to the flow identifier: addition, modification and deletion.

In the present embodiment, the management information may include an indicating bit, and the indicating bit may be used for indicating that the management information includes a function identification value for invoking the function entry and does not include an explicit numerical value to be assigned to the flow identifier.

In the present embodiment, a source of the function entry comprises one of the following: a manufacturer embeds the function entry in the OpenFlow switch during the manufacturing process, an OpenFlow configuration point configures the function entry to the OpenFlow switch through an extended OF-Config protocol, and the OpenFlow controller carries the function entry in a function entry management message and sends same to the OpenFlow switch.

In the present embodiment, the function entry management message may comprise a configuration message and/or a read message for a function table including the function entry, wherein the configuration message for the function table is used for performing one of the following managements on the function table and the function entry in the function table: addition, modification and deletion; and the read message for the function table is used for reading the function table and the function entry in the function table.

In the present embodiment, after receiving the configuration message and/or the read message for the function table, the OpenFlow switch performs a local configuration and/or read operation on the function entry; and in the case where the local configuration and/or read operation fails, the OpenFlow switch sends an error message for indicating that the corresponding local configuration and/or read operation fails to the OpenFlow controller.

In the present embodiment, in the case where the source of the function entry is that the OpenFlow controller carries the function entry in the function entry management message and sends same to the OpenFlow switch, before the OpenFlow controller issues the function entry, the OpenFlow switch may receive a message for querying a capability of supporting the function entry sent by the OpenFlow controller, wherein the message for querying the capability of supporting the function entry is used for querying whether the OpenFlow switch has the capability of supporting the function entry and which function entry can be supported.

In the present embodiment, the content of the function entry may comprise: a function ID field, a function parameter field and a function field, wherein the function ID field is an ID of the function entry for invoking the function entry when a value is assigned to the flow identifier; the function parameter field is used for selecting fields from the packet to serve as a function parameter; and the function field is used for indicating a predetermined function calculation method and algorithm.

In the present embodiment, the flow identifier may comprise one of the following: a Pseudo Wire (PW) flow label, a Label Switched Path (LSP) entropy label and a Provider Backbone Bridging (PBB) flow filter label.

A system for encapsulating a flow identifier is provided in an embodiment of the disclosure. FIG. 8 is a structural block diagram of a system for encapsulating a flow identifier according to an embodiment of the disclosure, and the system is configured to realize the method for encapsulating the flow identifier provided in the above-mentioned embodiment. As shown in FIG. 8, the system mainly comprises an OpenFlow controller, an OpenFlow configuration point and an OpenFlow switch, wherein the OpenFlow switch comprises an adding component 10 and an assignment component 20. The adding component 10 is configured to add a flow identifier to a packet in the case where flow table matching is successfully performed on the packet; and the assignment component 20 is configured to invoke a function entry to assign a value to the flow identifier, so as to complete the encapsulation of the flow identifier.

In the present embodiment, the management information may include an indicating bit, and the indicating bit may be used for indicating that management information includes a function identification value for invoking the function entry and does not include an explicit numerical value to be assigned to the flow identifier.

In the present embodiment, the source of the function entry may comprise one of the following: the manufacturer embeds the function entry inside the OpenFlow switch in the manufacturing process, an OpenFlow configuration point configures the function entry to the OpenFlow switch through an extended OF-Config protocol, and the OpenFlow controller carries the function entry in a function entry management message and sends same to the OpenFlow switch.

In the present embodiment, the function entry management message may comprise a configuration message and/or a read message for a function table including the function entry, wherein the configuration message for the function table is used for performing one of the following managements on the function table and the function entry in the function table: addition, modification and deletion; and the read message for the function table is used for reading the function table and the function entry in the function table.

In the present embodiment, the content of the function entry may comprise: a function ID field, a function parameter field and a function field, wherein the function ID field is a function identification value for invoking the function entry when the value is assigned to the flow identifier; the function parameter field is used for selecting fields from the packet to serve as a function parameter; and the function field is used for indicating a predetermined function calculation method and algorithm.

In the present embodiment, the flow identifier may comprise one of the following: a Pseudo Wire (PW) flow label, a Label Switched Path (LSP) entropy label and a Provider Backbone Bridging (PBB) flow filtering tag.

Figure 9:
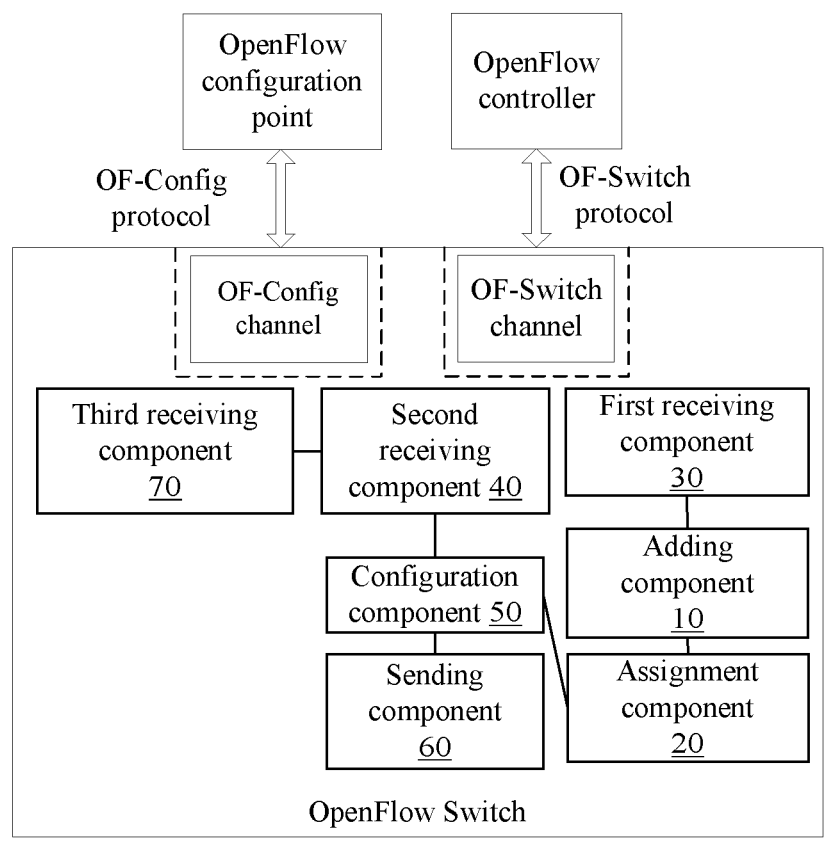
FIG. 9 shows a structural block diagram of a system for encapsulating a flow identifier according to a preferred embodiment of the disclosure.

FIG. 9 is a structural block diagram of a system for encapsulating a flow identifier according to a preferred embodiment of the disclosure. As shown in FIG. 9, the system for encapsulating the flow identifier provided in the embodiment of the disclosure comprises an OpenFlow controller, an OpenFlow configuration point and an OpenFlow switch, wherein the OpenFlow switch also may comprise a first receiving component 30 configured to receive a flow table configuration message from the OpenFlow controller, wherein the flow table configuration message comprises flow table information and/or management information, wherein the flow table information comprises a flow table entry comprising an instruction for adding the flow identifier and an instruction for invoking the function entry to assign the value to the flow identifier; and the management information is used for performing one of the following managements on the operation of invoking the function entry to assign the value to the flow identifier: addition, modification and deletion.

In the present preferred embodiment, the OpenFlow switch further may comprise a second receiving component 40 configured to receive the configuration message and/or the read message for the function table including the function entry, which is sent by the OpenFlow controller; a configuration component 50 configured to perform the local configuration and/or read operation on the function entry according to the configuration message and/or the read message for the function table including the function entry; and a sending component 60 configured to send an error message for indicating that the corresponding configuration and/or read operation fails to the OpenFlow controller in the case where the local configuration and/or read operation fails.

In the present preferred embodiment, in the case where the source of the function entry is that the OpenFlow controller carries the function entry in a function entry management message and sends same to the OpenFlow switch, the OpenFlow switch further may comprise a third receiving component 70 configured to receive, before the OpenFlow controller sends the function entry, a message for querying the capability of supporting the function entry sent by the OpenFlow controller, wherein the message for querying the capability of supporting the function entry is used for querying whether the OpenFlow switch has a capability of supporting the function entry or not and which function entry can be supported.

By using the method and system for encapsulating the flow identifier are provided in the embodiment of the disclosure, the OpenFlow switch may add the flow identifier to the packet, and invokes the pre-saved function entry to assign the value to the flow identifier, so as to complete the encapsulation of the flow identifier, thereby achieving the effect of enabling an OpenFlow network node to take a hash calculation result of some fields of an original packet before encapsulation as the value of the new added flow identifier, which is required by the encapsulation of the flow identifier.

The method and system for encapsulating the flow identifier provided in the above-mentioned embodiments are described and illustrated in more detail below in conjunction with FIG. 10 to FIG. 17 and preferable embodiment I and preferable embodiment II.

Figure 10:
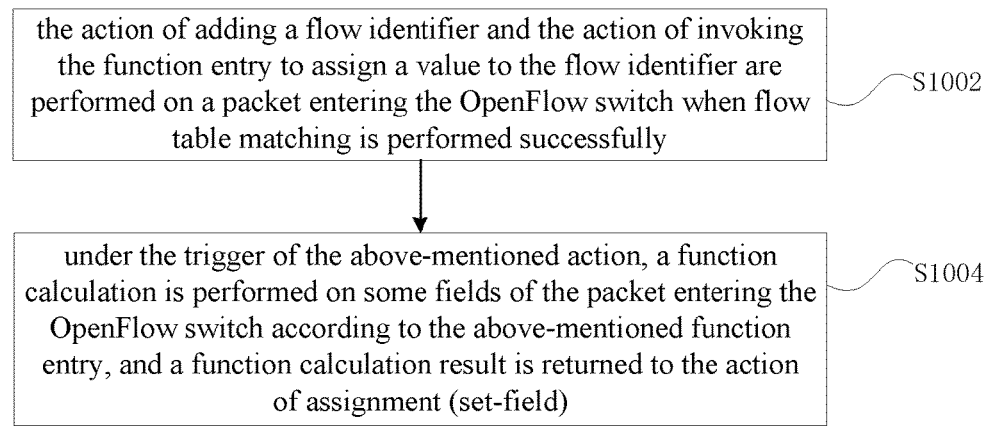
FIG. 10 shows a flowchart for encapsulating a flow identifier in an OpenFlow network according to a preferred embodiment of the disclosure.

FIG. 10 shows a flowchart for encapsulating a flow identifier in an OpenFlow network according to a preferred embodiment of the disclosure. As shown in FIG. 10, the flow includes the following steps (Step 1002-Step 1004).

In step S1002, the action of adding a flow identifier and the action of invoking the function entry to assign a value to the flow identifier are performed on a packet entering the OpenFlow switch when flow table matching is performed successfully.

In the related art, when the flow table matching is successful, although the action of adding a flow identifier and the action of assigning a value to the flow identifier may also be performed, only an explicit numerical value can be assigned to the flow identifier, no function entry can be invoked, and the requirement of acquiring the assignment of the flow identifier according to a hash calculation of some fields of a packet before encapsulation cannot be fulfilled.

FIG. 11 shows a schematic flow chart illustrating an OpenFlow switch processes a packet to realize adding an outer label and assigning a value to the outer label according to a preferred embodiment of the disclosure. As shown in FIG. 11, the OpenFlow switch comprises a function table, and the function table may comprise a plurality of function entries to be invoked by the action of "set-field (assignment)" in the flow table. FIG. 12 shows a format diagram of an OpenFlow function table according to a preferred embodiment of the disclosure. As shown in FIG. 12, each function entry comprises a "function ID" field, and the field is an identifier which is used when the function entry is invoked by the action of "set-field" included in the flow table; each function entry comprises a "function parameters" field, and the field is used for selecting some fields of the packet entering the OpenFlow switch as function parameters; and each function entry comprises a "function" field, and the field is used for indicating a specified function calculation method and algorithm.

In step S1004, under the trigger of the above-mentioned action, a function calculation is performed on some fields of the packet entering the OpenFlow switch according to the above-mentioned function entries, and a function calculation result is returned to the action of assignment ("set-field").

FIG. 13 shows another flowchart illustrating the encapsulation of the flow identifier in an OpenFlow network according to a preferred embodiment of the disclosure. As shown in FIG. 13, the flow comprises the following steps (S1302-S1304).

In step S1302, management information is added in a first message sent by the OpenFlow controller to the OpenFlow switch, wherein the above-mentioned management information is used for performing one of the following managements on a designated action: addition, modification and deletion, and the above-mentioned designated action is used for invoking the function entry to assign a value to the flow identifier. The above-mentioned first message comprises but not limited to: a flow table configuration message.

In the related art, the flow table configuration message sent by the OpenFlow controller to the OpenFlow switch comprises management information for adding, modifying or deleting the action of assigning the outer label; however, the parameters for the action of assigning the outer label can only be an explicit assigned numerical value. In order to add the management information about the action of invoking the function entry to assign the value to the flow identifier, a reserved bit in the management information about the action of assigning the outer label may be used to identify whether the parameter of the action of assigning the outer label is the explicit assigned numerical value, or a function identification value pointing to the function entry, and this reuses the related technologies to the maximum.

In order to further support the above-mentioned process, one of the following messages is added to the messages sent by the OpenFlow controller to the OpenFlow switch: a configuration message and a read message of a function table to which the function entry belongs, wherein the above-mentioned configuration message is used for performing one of the following managements on the function table and the function entry in the function table: addition, modification and deletion; and the above-mentioned read message is used for reading the above-mentioned function table and the above-mentioned function entry. That is, the OpenFlow controller needs to send at least one of the above-mentioned messages to the OpenFlow switch. If the function table in the OpenFlow switch is embedded inside the OpenFlow switch when the OpenFlow switch is manufactured, or is configured by the OpenFlow configuration point through the extended OF-Config protocol, there is no need for the OpenFlow controller to send the above-mentioned configuration message to configure the function entry, otherwise, the OpenFlow controller needs to send the above-mentioned configuration message to the OpenFlow switch to configure the function entry. In this case, in order to ensure that the function entry configured by the OpenFlow controller is a function which can be supported by the OpenFlow switch, a message for querying the capability of supporting the function entry needs to be added to the messages sent by the OpenFlow controller to the OpenFlow switch, the OpenFlow controller firstly sends the above-mentioned query message before sending the above-mentioned configuration message to the OpenFlow switch, so that the OpenFlow controller learns in advance whether the OpenFlow switch has a capability supporting the function entry or not and which function entry can be supported.

In step S1304, the above-mentioned first message is sent to the OpenFlow switch.

In order to enable the OpenFlow controller to timely learn whether the OpenFlow switch supports the function entry, function table error reporting information is added to a second message sent by the OpenFlow switch to the OpenFlow controller, wherein the above-mentioned function table error reporting information is used for reporting, when an exception occurs to the configuration performed on the above-mentioned function table according to the above-mentioned configuration message or an exception occurs to the reading performed on the above-mentioned function table according to the above-mentioned read message, the exception to the above-mentioned OpenFlow controller. The above-mentioned second message comprises but not limited to: an error reporting message, i.e., the above-mentioned function table error reporting information can be added to the existing error reporting message.

Preferred Embodiment I

In the present preferred embodiment, the encapsulation of the PW flow label needs to be completed for all the packets belonging to VLAN100 (VLAN_ID=100) at an Ethernet port 10 (In_Port=10) of the OpenFlow switch.

As shown in FIG. 4 and FIG. 11, in the present preferred embodiments, the OpenFlow controller and the OpenFlow switch in the OpenFlow network may perform the following steps (step 1-step 2).

In step 1, an OF-Switch protocol is running between the OpenFlow controller and the OpenFlow switch, and the OpenFlow controller sends a flow table and a function table to the OpenFlow switch.

FIG. 14 shows a schematic diagram of the content of a flow table in the OpenFlow switch according to preferred embodiment I of the disclosure. As shown in FIG. 14, there is only a single flow table in the OpenFlow switch, the flow table comprises a flow table entry, the matching fields in the flow table entry comprises "ingress port 10" and "belonging to VLAN100", and the instruction fields in the flow table entry comprise constructions for "performing the action of adding a PW flow label" and for "performing the action of invoking the function entry 101 to assign the PW flow label". FIG. 15 shows a schematic diagram of the content of a function table in the OpenFlow switch according to preferred embodiment I of the disclosure. As shown in FIG. 15, the function table comprises a function table entry, i.e., comprising a function entry, the function completes a hash calculation using hash algorithm 1 according to the MAC address and the IP quintuple of a packet entering the switch, and the identifier of the function is 101.

In the case where the flow table and the function table which are sent by the OpenFlow controller to the OpenFlow switch are failed to be configured on the OpenFlow switch occurs, the OpenFlow switch sends an error message reporting that the corresponding configuration fails to the OpenFlow controller.

In step 2, flow table matching is firstly performed on the packet entering the OpenFlow switch from an ingress port, instructions including "performing the action of adding the PW flow label" (Push MPLS Label) and "performing the action of invoking a function entry 101 to assign the PW flow label" (Set MPLS Label ID101) are performed on packets which match the ingress port 10 and VLAN100 (In_Port=10, VLAN_ID=100) successfully, wherein the latter action invokes function 101 to perform a hash calculation using hash algorithm 1 according to the MAC address and the IP quintuple of a packet entering the switch, and assign the calculation result (hash value) to the PW flow label.

Preferred Embodiment II

In the present preferred embodiment, the encapsulation of the LSP entropy label needs to be performed for all the packets on an Ethernet port 20 (In_Port=20) of the OpenFlow switch, and the encapsulation of the PBB flow filtering tag needs to be performed for all the packets on an Ethernet port 30 (In_Port=30) of the OpenFlow switch.

As shown in FIG. 4 and FIG. 11, in the present preferred embodiments, the OpenFlow controller and the OpenFlow switch in the OpenFlow network may perform the following steps (step 1-step 2).

In step 1, an OF-Switch protocol is running between the OpenFlow controller and the OpenFlow switch, and the OpenFlow controller sends a flow table and a function table to the OpenFlow switch.

FIG. 16 shows a schematic diagram of the content of a flow table in the OpenFlow switch according to preferred embodiment II of the disclosure. As shown in FIG. 16, there is only a single flow table in the OpenFlow switch, the flow table comprises two flow table entries, wherein in the first flow table entry, the matching fields comprise "ingress port 20", and the instruction fields comprise constructions for "performing the action of adding an LSP entropy label" and "performing the action of invoking the function entry 102 to assign the LSP entropy label", and in the second flow table entry, the matching fields comprise "ingress port 30", and the instruction fields comprise constructions for "performing the action of adding a PBB flow filtering tag" and "performing the action of invoking a function entry 103 to assign the PBB flow filtering tag". FIG. 17 is a schematic diagram of the content of a function table in the OpenFlow switch according to preferred embodiment II of the disclosure. As shown in FIG. 17, the function table comprises two function table entries, i.e., comprising two function entries, wherein the first function entry completes a hash calculation using hash algorithm 2 according to the IP quintuple of a packet entering the switch, with the identifier of the function being 102, and the second function entry completes a hash calculation using hash algorithm 3 according to the MAC address and the IP quintuple of a packet entering the switch, with the identifier of the function being 103.

In the case where the flow table and the function table which are sent by the OpenFlow controller to the OpenFlow switch are failed to be configured on the OpenFlow switch occurs, the OpenFlow switch sends an error message reporting that a corresponding configuration fails to the OpenFlow controller.

In step 2, flow table matching is firstly performed on a packet entering the OpenFlow switch from an ingress port, instructions including "performing the action of adding an LSP entropy label" (Push MPLS Label) and "performing the action of invoking a function entry 102 to assign the LSP entropy label" (Set MPLS Label ID102) are performed on packets which match the ingress port 20 (In_Port=20) successfully, wherein the latter action invokes function 102 to perform a hash calculation using hash algorithm 2 according to the IP quintuple of a packet entering the switch, and assigns the calculation result (hash value) to the LSP entropy label; instructions including "performing the action of adding a PBB flow filtering tag" (Push Flow Filtering Tag) and "performing the action of invoking a function entry 103 to assign the PBB flow filtering tag" (Set Flow Filtering Tag ID103) are performed on packets which match the ingress port 30 (In_Port=30) successfully, wherein the latter action invokes function 103 to perform a hash calculation using hash algorithm 3 according to the MAC address and the IP quintuple of a packet entering the switch, and assigns the calculation result (hash value) to the PBB flow filtering tag.

It should be noted that the above-mentioned various components may be achieved by hardware. For example, a processor comprises the above-mentioned various components, or the above-mentioned various components are respectively located in a processor.

In another embodiment, software is also provided, and the software is used to execute the above-mentioned embodiments or the technical solution described in the example embodiment.

In another embodiment, a storage medium is also provided, wherein the storage medium stores the above-mentioned software, and the storage medium includes but is not limited to an optical disk, a soft disk, a hard disk, an erasable storage, etc.

From the description above, it can be seen that the present disclosure realizes the following technical effects: the embodiments of the disclosure can extend the implementation mechanism for the assignment of the new added outer label stipulated by the OpenFlow switch specification made by the ONF, the action of assigning the outer label through invoking the function entry is added in the packet processing flow, the existing OF-Switch protocol is extended to support the query of the function entry supporting capability of the OpenFlow switch and configure and/or read the function table of the OpenFlow switch, and the encapsulation of the flow label is realized in the OpenFlow network.

Obviously, a person skilled in the art would understand that the above components and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. Thus, the present disclosure is not limited to any particular combination of hardware and software.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection defined by the appended claims of the disclosure.

INDUSTRIAL APPLICABILITY

As stated above, the method and system for encapsulating the flow identifier provided in the embodiments of the disclosure have the following beneficial effects: the embodiments of the disclosure can extend the implementation mechanism for the assignment of the new added outer label stipulated by the OpenFlow switch specification made by the ONF, the action of assigning the outer label through invoking the function entry is added in the packet processing flow, the existing OF-Switch protocol is extended to support the query of the function entry supporting capability of the OpenFlow switch and configure and/or read the function table of the OpenFlow switch, and the encapsulation of the flow label is realized in the OpenFlow network.

What is claimed is:

1. A method for encapsulating a flow identifier, comprising:
   in the case where flow table matching is successfully performed on a packet, adding, by an OpenFlow switch, a flow identifier to the packet; and
   invoking, by the OpenFlow switch, a pre-saved function entry to assign a value to the flow identifier, so as to complete encapsulation of the flow identifier;
   wherein content of the function entry comprises: a function ID field, a function parameter field and a function field, wherein
   the function ID field is a function identification value for invoking the function entry when the flow identifier is assigned;
   the function parameter field is used for selecting fields from the packet to serve as a function parameter; and
   the function field is used for indicating a predetermined function calculation method and algorithm.

2. The method according to claim 1, wherein before the OpenFlow switch performs the flow table matching on the packet, the method comprises:
   receiving, by the OpenFlow switch, a flow table configuration message from an OpenFlow controller, wherein the flow table configuration message comprises flow table information and/or management information, wherein
   the flow table information comprises a flow table entry comprising an instruction for adding the flow identifier and an instruction for invoking the function entry to assign the value to the flow identifier; and
   the management information is used for performing one of the following managements on the operation of invoking the function entry to assign the value to the flow identifier: addition, modification and deletion.

3. The method according to claim 2, wherein the management information includes an indicating bit, the indicating bit being used for indicating that the management information includes a function identification value for invoking the function entry and does not include an explicit numerical value to be assigned to the flow identifier.

4. The method according to claim 3, wherein content of the function entry comprises: a function ID field, a function parameter field and a function field, wherein
   the function ID field is a function identification value for invoking the function entry when the flow identifier is assigned;
   the function parameter field is used for selecting fields from the packet to serve as a function parameter; and
   the function field is used for indicating a predetermined function calculation method and algorithm.

5. The method according to claim 2, wherein content of the function entry comprises: a function ID field, a function parameter field and a function field, wherein
   the function ID field is a function identification value for invoking the function entry when the flow identifier is assigned;
   the function parameter field is used for selecting fields from the packet to serve as a function parameter; and
   the function field is used for indicating a predetermined function calculation method and algorithm.

6. The method according to claim 1, wherein the source of the function entry comprises one of the following:
   embedding, by a manufacturer, the function entry in the OpenFlow switch in a manufacturing process, configuring, by an OpenFlow configuration point, the function entry to the OpenFlow switch through an extended OF-Config protocol, and carrying, by the OpenFlow controller, the function entry in a function entry management message and sending the function entry management message to the OpenFlow switch.

7. The method according to claim 6, wherein the function entry management message comprises a configuration message and/or a read message for a function table including the function entry, wherein
   the configuration message for the function table is used for performing one of the following managements on the function table and the function entry in the function table: addition, modification and deletion; and
   the read message for the function table is used for reading the function table and the function entry in the function table.

8. The method according to claim 7, wherein the method further comprises:
   after receiving the configuration message and/or the read message for the function table, performing, by the OpenFlow switch, a local configuration and/or read operation on the function entry; and
   in the case where the local configuration and/or read operation fails, sending, by the OpenFlow switch, an error message for indicating that the corresponding local configuration and/or read operation fails to the OpenFlow controller.

9. The method according to claim 6, wherein in the case where the source of the function entry is that the OpenFlow controller carries the function entry in the function entry management message and sends the function entry management message to the OpenFlow switch, the method comprises:
   before the OpenFlow controller sends the function entry, receiving, by the OpenFlow switch, a message for querying the capability of supporting the function entry sent by the OpenFlow controller, wherein the message for querying the capability of supporting the function entry is used for querying whether the OpenFlow switch has a capability supporting the function entry and which function entry can be supported.

10. The method according to claim 1, wherein the flow identifier comprises one of the following: a Pseudo Wire (PW) flow label, a Label Switched Path (LSP) entropy label and a Provider Backbone Bridging (PBB) flow filtering tag.

11. A system for encapsulating a flow identifier, comprising an OpenFlow controller, an OpenFlow configuration point and an OpenFlow switch, wherein the OpenFlow switch comprises:
an adding component configured to add a flow identifier to the packet in the case where flow table matching is successfully performed on a packet; and
an assignment component configured to invoke a function entry to assign a value to the flow identifier, so as to complete encapsulation of the flow identifier;
wherein content of the function entry comprises: a function ID field, a function parameter fields and a functional function field, wherein
the function ID field is a function identification value for invoking the function entry when a value is assigned to the flow identifier;
the function parameter field is used for selecting fields from the packet to serve as a function parameter; and
the function field is used for indicating a predetermined function calculation method and algorithm.

12. The system according to claim 11, wherein the OpenFlow switch further comprises:
a first receiving component configured to receive a flow table configuration message from the OpenFlow controller, wherein the flow table configuration message comprises flow table information and/or management information, wherein
the flow table information comprises a flow table entry comprising an instruction for adding the flow identifier and an instruction for invoking the function entry to assign a value to the flow identifier; and
the management information is used for performing one of the following managements on the operation of invoking the function entry to assign the value to the flow identifier: addition, modification and deletion.

13. The system according to claim 12, wherein the management information includes an indicating bit, the indicating bit being used for indicating that the management information includes an function identification value for invoking the function entry and does not include an explicit numerical value to be assigned to the flow identifier.

14. The system according to claim 11, wherein the source of the function entry comprises one of the following:
embedding, by the manufacturer, the function entry in the OpenFlow switch in the manufacturing process, configuring, by the OpenFlow configuration point, the function entry to the OpenFlow switch through an extended OF-Config protocol, and carrying, by the OpenFlow controller, the function entry in a function entry management message and sending the function entry management message to the OpenFlow switch.

15. The system according to claim 14, wherein the function entry management message comprises a configuration message and/or read message for a function table including the function entry, wherein
the configuration message for the function table is used for performing one of the following managements on the function table and the function entry in the function table: addition, modification and deletion; and
the read message for the function table is used for reading the function table and the function entry in the function table.

16. The system according to claim 15, wherein the OpenFlow switch further comprises:
a second receiving component configured to receive the configuration message and/or the read message for the function table including the function entry, which is sent by the OpenFlow controller;
a configuration component configured to perform a local configuration and/or read operation on the function entry according to the configuration message and/or the read message for the function table including the function entry; and
a sending component configured to send an error message for indicating that the corresponding local configuration and/or read operation fails to the OpenFlow controller in the case where the local configuration and/or read operation fails.

17. The system according to claim 14, wherein in the case where the source of the function entry is that the OpenFlow controller carries the function entry in a function entry management message and sends the function entry management message to the OpenFlow switch, the OpenFlow switch comprises:
a third receiving component configured to receive, before the OpenFlow controller sends the function entry, a message for querying a capability of supporting the function entry sent by the OpenFlow controller, wherein the message for querying the capability of supporting the function entry is used for querying whether the OpenFlow switch has a capability of supporting the function entry or not and which function entry can be supported.

18. The system according to claim 11, wherein the flow identifier comprises one of the following: a Pseudo Wire (PW) flow label, a Label Switched Path (LSP) entropy label and a Provider Backbone Bridging (PBB) flow filtering tag.

* * * * *